US012745105B2

(12) United States Patent
Liu

(10) Patent No.: US 12,745,105 B2
(45) Date of Patent: Sep. 22, 2026

(54) METHOD FOR CONFIGURING SIDELINK RELAY ARCHITECTURE AND TERMINAL

(71) Applicant: VIVO MOBILE COMMUNICATION CO., LTD., Guangdong (CN)

(72) Inventor: Jiamin Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 754 days.

(21) Appl. No.: 18/152,936

(22) Filed: Jan. 11, 2023

(65) Prior Publication Data

US 2023/0144480 A1 May 11, 2023

Related U.S. Application Data

(63) Continuation of application No. PCT/CN2021/108846, filed on Jul. 28, 2021.

(30) Foreign Application Priority Data

Jul. 30, 2020 (CN) ......................... 202010753310.6

(51) Int. Cl.
*H04W 24/02* (2009.01)
*H04W 76/14* (2018.01)
(Continued)

(52) U.S. Cl.
CPC ........... *H04W 24/02* (2013.01); *H04W 76/14* (2018.02); *H04W 88/04* (2013.01); *H04W 92/18* (2013.01)

(58) Field of Classification Search
CPC ... H04W 24/02; H04W 40/22; H04W 40/246; H04W 48/16; H04W 76/14; H04W 88/04;
(Continued)

(56) References Cited

U.S. PATENT DOCUMENTS

2015/0092942 A1* 4/2015 Wager .................... H04W 12/04 380/270
2016/0330781 A1 11/2016 Kalhan et al.
(Continued)

FOREIGN PATENT DOCUMENTS

CN 110574476 A 12/2019
CN 110677921 A 1/2020
(Continued)

OTHER PUBLICATIONS

MediaTek Inc., Scenarios and Assumptions on Sidelink Relay, Discussion and decision, 3GPP TSG-RAN WG2 Meeting #111 electronic, R2-2006570, Aug. 17-28, 2020, Online.
(Continued)

*Primary Examiner* — Thomas R Cairns
(74) *Attorney, Agent, or Firm* — Price Heneveld LLP

(57) ABSTRACT

Embodiments of this application disclose a method for configuring a sidelink relay architecture and a terminal, so as to resolve a problem that a remote terminal cannot obtain a sidelink configuration for the sidelink relay architecture. The method can be applied to a remote terminal, and includes: determining a sidelink configuration for the sidelink relay architecture based on at least one of the following: pre-configuration information; a system message received from a camping cell or serving cell; first configuration information from a relay terminal; and second configuration information from a network-side device.

15 Claims, 3 Drawing Sheets

(51) Int. Cl.
*H04W 88/04* (2009.01)
*H04W 92/18* (2009.01)

(58) Field of Classification Search
CPC ..... H04W 92/18; H04W 8/005; H04W 16/18; H04W 36/0083; H04W 72/02; H04W 76/23; H04W 84/047; H04W 88/18; H04B 1/7075; H04B 7/15; H04B 7/15528–1555; H04L 41/0823
See application file for complete search history.

(56) References Cited

U.S. PATENT DOCUMENTS

| | | | | |
|---|---|---|---|---|
| 2018/0324842 | A1 | 11/2018 | Gulati et al. | |
| 2018/0343556 | A1 | 11/2018 | Wang et al. | |
| 2019/0215685 | A1 | 7/2019 | Wang et al. | |
| 2020/0092685 | A1* | 3/2020 | Fehrenbach | H04W 72/23 |
| 2020/0100088 | A1 | 3/2020 | Kim et al. | |
| 2020/0229194 | A1* | 7/2020 | Belleschi | H04L 5/0064 |
| 2020/0389900 | A1 | 12/2020 | Lee et al. | |
| 2021/0144791 | A1* | 5/2021 | Kang | H04W 76/27 |
| 2021/0212050 | A1 | 7/2021 | Lu et al. | |
| 2021/0297899 | A1* | 9/2021 | Baek | H04L 1/08 |
| 2021/0314112 | A1* | 10/2021 | Balasubramanian | H04L 5/0076 |
| 2022/0053517 | A1* | 2/2022 | Kim | H04L 1/1812 |
| 2022/0109970 | A1* | 4/2022 | Jeong | H04W 72/02 |
| 2022/0303821 | A1* | 9/2022 | Kang | H04W 28/0278 |
| 2022/0346162 | A1* | 10/2022 | Van Phan | H04W 40/22 |
| 2023/0066281 | A1* | 3/2023 | Tseng | H04W 76/18 |
| 2023/0073469 | A1* | 3/2023 | Wang | H04W 40/22 |
| 2023/0156839 | A1* | 5/2023 | Bi | H04W 88/04 370/329 |
| 2023/0269799 | A1* | 8/2023 | Cai | H04W 72/40 370/329 |

FOREIGN PATENT DOCUMENTS

| | | | | |
|---|---|---|---|---|
| CN | 110679190 A | 1/2020 | | |
| CN | 112771956 A | 5/2021 | | |
| EP | 3531723 A1 | 8/2019 | | |
| EP | 3579642 A1 | 12/2019 | | |
| KR | 20180112810 A | 10/2018 | | |
| WO | 2018208114 A1 | 11/2018 | | |
| WO | 2019061167 A1 | 4/2019 | | |
| WO | 2020037688 A1 | 2/2020 | | |
| WO | WO-2020222595 A1 * | 11/2020 | | H04W 72/20 |

OTHER PUBLICATIONS

3rd Generation Partnership Project, Technical Specification Group Services and System Aspects; Study on system enhancement for Proximity based Services (ProSe) in the 5G System (5GS), (Release 17), 3GPP TR 23.752 V0.4.0 (Jun. 2020).

Coolpad, Resource Allocation for IC and OOC Scenarios, 3GPP TSG-RAN WG2 #92, R2-156399, Nov. 16-20, 2015, Anaheim, USA.

Vivo, Protocol stack and service continuity for L2 and L3 relay, 3GPP TSG-RAN WG2 Meeting #111-e, R2-2007041, E-Meeting, Aug. 17-Aug. 28, 2020.

Apple, Lenovo, Motorola Mobility, Mediatek Inc., Philips, Fraunhofer IIS, Fraunhofer HHI, Interdigital, KPN, AT&T, Convida Wireless, Sony, R17 Sidelink Relay, 3GPP TSG RAN Meeting #86, RP-193106, Dec. 9-12, 2019, Sitges, Spain.

3rd Generation Partnership Project, "Technical Specification Group Services and System Aspects; Proximity-based services (ProSe) Stage 2, (Release 16)", 3GPP TS 23.303 V16.0.0, Jul. 2020, Valbonne, France.

3rd Generation Partnership Project, "Technical Specification Group Radio Access Network; NR; Radio Resource Control (RRC) protocol specification (Release 16)", 3GPP TS 38.331 V16.1.0, Jul. 2020, Valbonne, France.

First Korean Office Action for Korean Patent Application No. 10-2023-7004643 mailed Sep. 23, 2025, 11 pages.

"3rd Generation Partnership Project; Technical Specification Group Services and System Aspects; Procedures for the 5G System (5GS); Stage 2 (Release 16)", 3GPP TS 23.502 V16.5.0 (Jul. 2020), Valbonne—France.

Ericsson, "Signalling to support UE-NW relay and Service continuity", 3GPP TSG-RAN WG2 #89bis Tdoc, R2-151148, Bratislava, Slovakia, Apr. 20-24, 2015.

* cited by examiner

200

Determine a sidelink configuration of a sidelink relay architecture based on at least one of the following: pre-configuration information; a system message received from a camping cell or serving cell; first configuration information from a relay terminal; and second configuration information from a network-side device

S202

METHOD FOR CONFIGURING SIDELINK RELAY ARCHITECTURE AND TERMINAL

CROSS-REFERENCE TO RELATED APPLICATIONS

The present application is a bypass continuation application of International Application No. PCT/CN2021/108846 filed on Jul. 28, 2021, which claims priority to Chinese Patent Application No. 202010753310.6, filed in China on Jul. 30, 2020 and entitled "METHOD FOR CONFIGURING SIDELINK RELAY ARCHITECTURE AND TERMINAL", both of which are incorporated herein by reference in their entireties.

TECHNICAL FIELD

This application belongs to the field of communication technologies, and specifically, relates to a method for configuring a sidelink relay architecture and a terminal.

BACKGROUND

Starting from Release 12, a long term evolution (LTE) system supports sidelink for direct data transmission between terminal devices without using a network device.

With the development of sidelink, a sidelink relay architecture is proposed in the related art. In a typical sidelink relay architecture, data from a remote terminal (remote UE) is transmitted to a relay terminal (relay UE) via a sidelink (or referred to as relay link) between the remote terminal and the relay terminal and forwarded by the relay terminal to a network device. In the sidelink relay architecture, the remote terminal can perform data transmission with the network device, and the relay terminal plays the role of data forwarding.

The relay terminal is introduced in sidelink relay architectures. How a remote terminal obtains a sidelink configuration for a sidelink relay architecture to ensure normal message transmission is a technical problem that needs to be resolved urgently in the related art.

SUMMARY

Embodiments of this application are intended to provide a method for configuring a sidelink relay architecture and a termina.

According to a first aspect, a method for configuring a sidelink relay architecture is provided, applied to a remote terminal. The method includes: determining a sidelink configuration for the sidelink relay architecture based on at least one of the following: pre-configuration information; a system message received from a camping cell or serving cell; first configuration information from a relay terminal; and second configuration information from a network-side device.

According to a second aspect, a remote terminal is provided, including: a determining module, configured to determine a sidelink configuration for the sidelink relay architecture based on at least one of the following: pre-configuration information; a system message received from a camping cell or serving cell; first configuration information from a relay terminal; and second configuration information from a network-side device.

According to a third aspect, a terminal is provided. The terminal includes a processor, a memory, and a program or instructions stored in the memory and capable of running on the processor, and when the program or instructions are executed by the processor, the method according to the first aspect is implemented.

According to a fourth aspect, a readable storage medium is provided. The readable storage medium stores a program or instructions, and when the program or instructions are executed by a processor, the method according to the first aspect is implemented.

According to a fifth aspect, a computer program product is provided. The computer program product includes a processor, a memory, and a program or instructions stored in the memory and capable of running on the processor, and when the program or instructions are executed by the processor, the method according to the first aspect is implemented.

According to a sixth aspect, a chip is provided. The chip includes a processor and a communication interface, the communication interface is coupled to the processor, and the processor is configured to run a program or instructions to implement the method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects rather than describe a specific order or sequence. It should be understood that data used in this way is used interchangeably in appropriate circumstances so that the embodiments of this application can be implemented in other orders than the order illustrated or described herein. In addition, objects differentiated by "first" and "second" are usually of a same type. The number of objects is not limited. For example, a first object may indicate one or more objects. "And/or" in the specification and claims represents at least one of connected objects. The character "I" generally indicates an "or" relationship between associated objects.

It should be noted that the technologies described in the embodiments of this application are not limited to long term evolution (LTE)/LTE-Advanced (LTE-A) systems, and may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably in the embodiments of this application. The technology described herein may be used in the above-mentioned systems and radio technologies as well as other systems and radio technologies. However, in the following descriptions, a new radio (NR) system is described for an illustration purpose, and NR terms are used in most of the following descriptions, although these technologies may also be applied to other applications than an NR system application, for example a $6^{th}$ generation (6G) communication system.

Figures 1, 2:
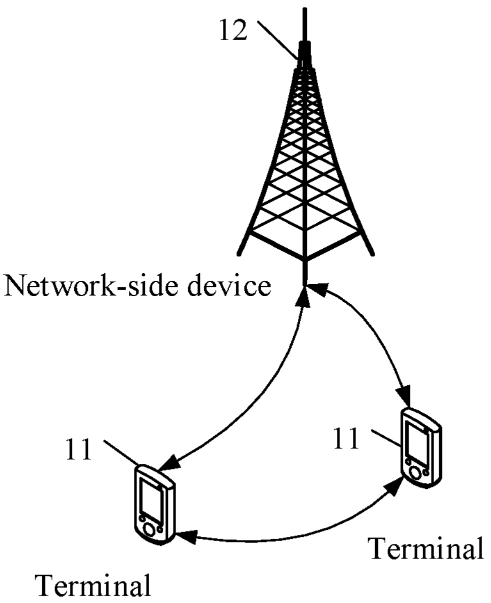
FIG. 1 is a block diagram of a wireless communication system according to an embodiment of this application.
FIG. 2 is a schematic flowchart of a method for configuring a sidelink relay architecture according to an embodiment of this application.

FIG. 1 is a block diagram of a wireless communication system to which an embodiment of this application is applicable. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device or a vehicle user equipment (VUE), or a pedestrian user equipment (PUE). The wearable device includes a wristband, earphones, glasses, or the like. It should be noted that the terminal 11 is not limited to any specific type in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a next generation NodeB (gNB), a home NodeB, a home evolved NodeB, a WLAN access point, a Wi-Fi node, a transmission-reception point (TRP), or some other appropriate terms in the art. Provided that the same technical effect is achieved, the base station is not limited to a specific technical term. It should be noted that the base station in the NR system is merely used as an example in the embodiments of this application, and a specific type of the base station is not limited.

As shown in FIG. 2, an embodiment of this application provides a method 200 for configuring a sidelink relay architecture. The method may be performed by a remote terminal. To be specific, the method may be performed by software or hardware installed on a remote terminal. The method includes the following step:

S202. Determine a sidelink configuration for the sidelink relay architecture based on at least one of the following: pre-configuration information; a system message received from a camping cell or serving cell; first configuration information from a relay terminal; and second configuration information from a network-side device.

Figure 3:
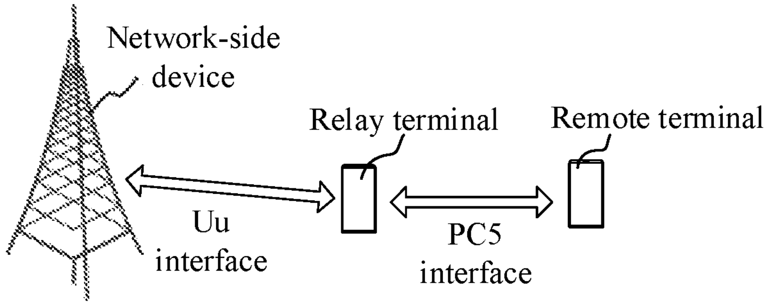
FIG. 3 is a schematic diagram of a relay architecture according to an embodiment of this application.

For the sidelink relay architecture used in this embodiment of this application, reference may be made to FIG. 3. In the sidelink relay architecture, the remote terminal (remote UE) can perform data transmission with the network device, and the relay terminal (relay UE) plays a role of data relay. In addition, the remote UE can also perform traditional sidelink transmission with the relay UE, and no network device is used in the transmission.

A sidelink transmission related configuration in the embodiments of this application may include a related configuration required for establishing a sidelink relay architecture between the remote terminal and the relay terminal, and may further include a related configuration required for data transmission between the remote terminal and the relay terminal after the sidelink relay architecture is established.

In this embodiment of this application, the remote terminal may determine the sidelink configuration for the sidelink relay architecture based on at least one of the following: the pre-configuration information; the system message received from a camping cell or serving cell; the first configuration information from the relay terminal; and the second configuration information from the network-side device. This embodiment of this application helps to keep a consistent understanding among a remote terminal, a relay terminal, and a network side, thereby improving communication effectiveness.

To describe in detail the method for configuring a sidelink relay architecture provided in this embodiment, several cases are provided below for detailed description.

Case 1. L3 Relay Architecture for Offline Remote UE

In case 1, the remote UE is in offline state before establishing an L3 relay architecture with the relay UE. In offline state, the remote UE cannot obtain any system message and configuration information related to sidelink/sidelink relay. In this case, S202 may be: determining, by the remote UE, the sidelink configuration for the sidelink relay architecture based on the pre-configuration information, where the remote UE is further configured to establish an L3 relay architecture with the relay UE based on the pre-configuration information. Specifically, for example, the remote UE uses a pre-configured sidelink/sidelink relay parameter to perform a discovery procedure with the relay UE, and then establishes the L3 relay architecture.

When operating in the L3 relay architecture, the remote UE may obtain the sidelink configuration for the sidelink relay architecture in two manners.

Manner 1. The sidelink configuration for sidelink relay architecture is determined still based on the pre-configuration information, for example, the pre-configured sidelink/sidelink relay parameter.

Manner 2. The sidelink configuration for sidelink relay architecture is determined based on first configuration information from the relay terminal received in a PC5 radio resource control (RRC) procedure. For example, the relay UE transmits a related sidelink/sidelink relay parameter to the remote UE through the PC5 RRC procedure, for use by the remote UE in relay operation. Parameter information of the relay UE comes from the network-side device. The first configuration information transmitted by the relay UE to the remote UE may be determined by the relay UE, or may refer to configuration information from the network-side device.

Case 2. L3 Relay Architecture for Online Remote UE

In case 2, the remote UE is in idle state or connected state before establishing an L3 relay architecture with the relay UE.

In normal cell camping state, the remote UE can obtain a system information configuration related to sidelink/sidelink relay. In this case, the remote UE may determine the sidelink configuration for the sidelink relay architecture based on the system message received from the cell. The remote UE may further establish an L3 relay architecture with the relay terminal based on the system message.

Alternatively, in normal RRC connected state, the remote UE can obtain a dedicated configuration related to sidelink/sidelink relay from a serving cell of the remote UE. In this case, the remote UE may determine the sidelink configuration for the sidelink relay architecture based on the second configuration information (which may refer to the dedicated configuration) from the network-side device. The remote UE may further establish an L3 relay architecture with the relay terminal based on the second configuration information.

When the remote UE satisfies a condition of L3 relay operation and needs to implement an L3 relay operation, the remote UE obtains configuration information in two manners.

Manner 1. In the L3 relay architecture, the sidelink configuration for the sidelink relay architecture is determined still based on the system message or the second configuration information. For example, the remote UE continues using a sidelink/sidelink relay parameter in currently obtained system information.

Manner 2. The sidelink configuration for the sidelink relay architecture is determined based on the first configuration information from the relay terminal received in a PC5 RRC procedure. For example, the relay UE transmits a related sidelink/sidelink relay parameter to the remote UE through the PC5 RRC procedure, for use by the remote UE in relay operation. Parameter information used by the relay UE comes from the network side. The first configuration information transmitted by the relay UE to the remote UE may be determined by the relay UE, or may refer to configuration information from the network-side device.

Optionally, before the L3 relay architecture is established, the remote UE is in connected state. In the L3 relay architecture, the remote UE may also release an RRC connection (for example, releasing a dedicated configuration), and determine the sidelink configuration for the sidelink relay architecture based on the system message received or determine the sidelink configuration for the sidelink relay architecture based on the first configuration information from the relay terminal received in the PC5 RRC procedure.

Optionally, in case 1 or case 2, the remote UE may further transmit first information to the relay UE in the PC5 RRC procedure, such as a discovery procedure with the relay UE. The first information includes at least one of the following of the remote terminal: camping cell information, a status of obtaining sidelink system information, and an offline status, where the relay terminal is further configured to transmit the first information to the network-side device. In this way, the network-side device can configure, for the remote UE, a sidelink configuration more suitable for the remote UE and the relay UE based on the first information.

Specifically, for example, the network-side device may transmit a sidelink configuration parameter to the relay UE based on the first information. The relay UE processes the sidelink configuration parameter received and transmits it to the remote UE (for example, the first configuration information sent as described above).

Optionally, in case 1 and case 2, after the remote UE determines the sidelink configuration for the sidelink relay architecture, the method further includes receiving third configuration information, where the third configuration information is a new configuration obtained by the remote UE from a new cell in a case that the relay UE moves out of a current cell. In the current cell, the remote UE and the relay UE have already established an L3 relay architecture.

In this embodiment, the remote UE may obtain a new configuration from a new cell in a case that both the remote UE and the relay UE move out of a current cell. In this embodiment, the remote UE may obtain the third configuration information through a system message (for example, SIB) or a PC5 RRC procedure. Optionally, the third configuration information may further include a dedicated configuration for the remote UE.

In this embodiment, for example, both the remote UE and the relay UE move out of the current cell and move to a new cell, and the remote UE obtains the third configuration information by reading a system message of the new cell. For another example, both the remote UE and the relay UE move out of the current cell and move to a new cell, the relay UE reads a system message of the new cell and transmits, based on the system message, the third configuration information to the remote UE through a PC5 RRC procedure.

Case 3. L2 Architecture for Offline Remote UE

In case 3, the remote UE is in offline state before establishing an L2 relay architecture with the relay UE. The remote UE is in offline state and therefore cannot obtain any system message and configuration information related to sidelink/sidelink relay. In this case, the remote UE may determine the sidelink configuration for the sidelink relay architecture based on the pre-configuration information. The remote UE is further configured to establish an L2 relay architecture with the relay terminal based on the pre-configuration information. For example, the remote UE may use a pre-configured sidelink/sidelink relay parameter to perform a discovery procedure with the relay UE, and then establishes the L2 relay architecture.

In L2 relay architecture operation, the remote UE obtains configuration information in two manners.

Manner 1. The sidelink configuration for the sidelink relay architecture is determined based on the second configuration information from the network-side device received in an RRC procedure.

Manner 2. The sidelink configuration for the sidelink relay architecture is determined based on the first configuration information from the relay terminal received in a PC5 RRC procedure.

Optionally, in the L2 relay architecture, the remote UE determines, for sidelink transmission based on the second configuration information received in the RRC procedure, a sidelink radio bearer (SLRB) configuration, a service data adaptation protocol (SDAP) configuration, and a packet data convergence protocol (PDCP) configuration. Specifically, for example, the remote UE obtains parameters such as SLRB, SDAP, and PDCP that are related to layer 3 from the network side in the RRC procedure of the remote UE.

Optionally, in the L2 relay architecture, the remote UE determines, based on the second configuration information or the first configuration information, a radio link control (RLC) bearer for sidelink transmission. For example, the remote UE may obtain parameters such as RLC bearer related to layer 2 from the network-side device in the RRC procedure or from the relay UE in a PC5 RRC procedure.

In case 3, since the remote UE does not have any camping/serving cell before performing a relay operation, optionally, after the remote UE establishes an RRC connection to the network-side device through the relay UE, a serving cell selected for the remote UE is a primary cell of the relay UE; or a serving cell selected for the remote UE is served by the same network-side device as a primary cell of the relay UE. Specifically, for example, the serving cell of the remote UE is preferably a cell consistent with the primary cell (Pcell) of the relay UE, or may be another cell served by the same base station as the Pcell.

Case 4. L2 Architecture for Online Remote UE

In case 4, the remote UE is in idle state or connected state before establishing an L2 relay architecture with the relay UE.

In normal cell camping state, the remote UE can obtain a system information configuration related to sidelink/sidelink relay. In this case, the remote UE determines the sidelink configuration for the sidelink relay architecture based on a system message received from a camping cell or a serving cell. The remote UE is further configured to establish an L2 relay architecture with the relay UE based on the system message.

Alternatively, in connected state, the remote UE has already obtained a dedicated configuration related to sidelink/sidelink relay from a serving cell of the remote UE. In this case, the remote UE may determine the sidelink configuration for the sidelink relay architecture based on the second configuration information (which may refer to the dedicated configuration) from the network-side device. The remote terminal is further configured to establish an L2 relay architecture with the relay terminal based on the second configuration information.

When the remote UE satisfies a condition of L2 relay operation and needs to implement an L2 relay operation, the remote UE obtains configuration information in two manners.

Manner 1. In the L2 relay architecture, the remote UE determines the sidelink configuration for sidelink relay architecture still based on the system message. For example, the remote UE continues using a sidelink/sidelink relay parameter in currently obtained system information.

Manner 2. In the L2 relay architecture, the remote UE determines the sidelink configuration for sidelink relay architecture based on the second configuration information from the network-side device received in an RRC procedure. For example, the remote UE uses, in a relay operation, a related sidelink/sidelink relay parameter obtained from a new serving cell in an RRC procedure of the remote UE. In this example, if the remote UE has a dedicated configuration before the L2 relay architecture is established (that is, the remote UE is in connected state before the L2 relay architecture is established), the remote UE may also determine, based on whether a serving cell changes, whether to release the dedicated configuration. For example, when a serving cell changes, the remote UE releases the dedicated configuration, and obtains the second configuration information from the new serving cell. In a case that a serving cell does not change, the dedicated configuration can be used continuously.

In case 4, optionally, when establishing an RRC connection to the network-side device, the remote UE may further carry home information of the remote UE, where the home information includes at least one of the following of the remote terminal: camping cell information, a status of obtaining sidelink system information, and an offline status. In this way, the network-side device can configure, for the remote UE, a sidelink configuration more suitable for the remote UE and the relay UE based on the home information of the remote UE.

In case 4, optionally, the remote UE may further determine whether the system message or second configuration information used in a first serving cell is applicable to a second serving cell, where the first serving cell is a serving cell before the remote terminal establishes an RRC connection, the second serving cell is a serving cell after the RRC connection is established, and the first serving cell is the same as or different from the second serving cell.

In case 4, optionally, the remote UE may further transmit service characteristics of transmission between the remote terminal and the relay terminal to the network-side device, where the service characteristics are used by the network-side device to configure radio bearer information for the remote terminal; and the remote UE may further receive the radio bearer information, and establish a radio bearer based on the radio bearer information. The radio bearer is used by the remote terminal to communicate with the relay terminal.

In case 4, optionally, the remote UE may further transmit service characteristics of transmission between the remote terminal and the relay terminal to the network-side device, where the service characteristics are used by the network-side device to configure dedicated resource information for the remote terminal; and the remote UE may further receive the dedicated resource information, and communicate with the relay terminal on a dedicated resource indicated by the dedicated resource information.

Case 5. Dual Connectivity (DC)/Carrier Aggregation (CA) Operation in L3 Relay Architecture In an L3 relay architecture, the relay UE may be configured with a CA and/or DC operation, while the remote UE has only a PC5 interface to communicate with the relay UE and has no direct link to a network.

In a case that the relay UE is configured with a CA or DC operation, if a network-side configuration restricts the performing of CA operations on a data radio bearer (DRB)/logical channel on a Uu interface of the relay UE and used for carrying data of the remote UE, CA transmission can be performed on the DRB/logical channel for the data corresponding to the remote UE according to an existing principle based on scheduling and logical channel priority rules.

If a DRB/logical channel on a Uu interface of the relay UE and used for carrying data of the remote UE is configured as a master cell group (MCG) bearer or a secondary cell group (SCG) bearer or a split bearer, related DC transmission operations can be performed on the DRB/logical channel for the data corresponding to the remote UE according to an existing principle.

On a PC5 interface, transmission between the remote UE and the relay UE may alternatively be multi-carrier transmission. The multi-carrier transmission follows multi-carrier transmission rules for PC5 interface, and is independent of CA/DC operations on the Uu interface of the relay UE.

Case 6: DC/CA Operation in L2 Relay Architecture

In an L2 relay architecture, the relay UE may be configured with a CA and/or DC operation, while the remote UE has a logical L3 connection to a network, and a PDCP anchor is on the network side, so that an MCG/SCG configuration for DC affects security of a bearer for the remote UE.

In a case that the relay UE is configured with a CA or DC operation, if a network-side configuration restricts the performing of CA operations on an RLC bearer on a Uu interface of the relay UE and used for carrying data of the remote UE, CA transmission can be performed on the RLC bearer for the data corresponding to the remote UE according to an existing principle based on scheduling and logical channel priority rules.

If an RLC bearer on a Uu interface of the relay UE and used for carrying data of the remote UE is configured as an MCG bearer or an SCG bearer or a split bearer, related DC transmission operations can be performed on the RLC bearer for the data corresponding to the remote UE according to an existing principle.

CA operations on the Uu interface of the relay UE do not affect the remote UE, because there is only one serving node, and only one PDCP security key is used. However, in a case that DC operations are configured on the Uu interface of the relay UE, if an RLC bearer on the Uu interface of the relay UE and used for carrying data of the remote UE is configured as an MCG bearer, an SCG bearer, or a split bearer, a PDCP entity corresponding to the remote UE uses, based on different final data anchors, a key, an MCG key, or an SCG key that are different from each other.

Based on the description of case 5 and case 6, optionally, the foregoing embodiments may further include the following step: performing multi-carrier sidelink transmission with the relay terminal (PC5 interface). Optionally, carrier aggregation CA or dual connectivity DC is configured for a Uu interface between the relay terminal and the network-side device.

Optionally, the remote UE may further perform CA duplication transmission for a target service with the relay terminal, where the CA duplication transmission for the target service is:

(1) directly configured for the remote terminal, where for example, in the L2 relay architecture, the remote UE reports a service requirement to the network, and the network configures a bearer, and directly instructs to perform CA duplication transmission on the bearer;

(2) configured by the network-side device for a sidelink radio bearer SLRB corresponding to the target service in a case that the remote terminal reports quality of service (QoS) of the target service, where specifically, for example, the remote UE reports its service QoS, the network side configures a mapping relationship between the SLRB and a QoS flow and further configures whether the SLRB is used for duplication, and certainly, the SLRB corresponding to the target service in this example is configured with duplication transmission;

(3) enabling a CA duplication transmission function in a QoS profile used for the target service, where for example, the network-side device configures that the CA duplication transmission function is disabled in a QoS profile 1, and that the CA duplication transmission function is enabled in a QoS profile 2; for example, a QoS profile of a service of the remote UE is the QoS profile 2, and the CA duplication transmission function is enabled for the service according to the configuration of the network side; and in this example, the CA duplication transmission function is enabled in the QoS profile used for the target service; or (4) enabling a CA duplication transmission function in a QoS feature profile of the target service, where for example, if packet delay budget (PDB) of a service configured on the network side is less than X and a block error rate (BLER) is less than Y, the CA duplication function is enabled, and in this example, PDB of the target service is less than X and a BLER thereof is less than Y.

Optionally, on a PC5 interface, multiple RLC bearers used by the remote UE to transmit duplicate data are respectively configured with different component carrier (CC) subsets.

Optionally, in a case that dual connectivity is configured at a Uu interface between the relay terminal and the network-side device: (1) the remote terminal uses a set of security parameters, and multiple data radio bearer DRBs of the remote terminal correspond to one network device; or (2) multiple DRBs of the remote terminal use multiple sets of security parameters.

To describe in detail the method for configuring a sidelink relay architecture provided in the embodiments of this application, the following provides description with reference to several specific embodiments.

Embodiment 1 of the Present Invention: Obtaining Configuration by Remote UE in L3 Architecture In an L3 architecture, there is no direct logical connection between remote UE and a network-side device (hereinafter referred to as the network). To be specific, a PC5 interface and a Uu interface are independent of each other, and in a case that the remote UE performs a relay operation, a camping state or serving cell of the remote UE is usually not affected.

In the L3 architecture, the remote UE obtains a relay operation related configuration mainly from the following: 1. pre-configuration information; 2. system message that the remote UE reads from a camping cell or serving cell; and 3. configuration information received by the remote UE from the relay UE through a PC5 RRC procedure.

In an example, if the remote UE is in offline state, that is, unable to obtain any system information related to sidelink/sidelink relay, the remote UE performs, based on pre-configuration information, all sidelink or sidelink relay operations in this case, for example, discovery procedures and various types (unicast/multicast/broadcast/relay operations) of reception and transmission. The pre-configuration information generally includes general configuration or configuration information valid with respect to a specific location area.

The remote UE may use the pre-configuration information in both a discovery procedure and a subsequent relay communication procedure, so as not to produce additional signaling overheads. However, considering lack of negotiation for configurations between the remote UE and the relay UE, for example, inability to know exactly a resource or parameter used by the other party, only blind detection is performed in a wide range such that communication efficiency is not high.

Optionally, in a case that the remote UE has completed a discovery procedure with the relay UE based on the pre-configuration information. The remote UE may inform the relay UE in the discovery procedure of information such as a camping cell/status of obtaining sidelink system information/offline status of the remote UE, the relay UE has requested a relay operation related configuration from a serving cell of the relay UE. The request information may also carry information such as the camping cell/status of obtaining sidelink system information/offline status of the remote UE, for example, information indicating that sidelink/sidelink relay system information configuration or offline status can be obtained from cell1.

The purpose of carrying the foregoing additional information in the request information is to enable the network side to provide a configuration more suitable than an existing configuration for the remote UE, provide a dedicated configuration for the relay UE, and optionally enable the network side to deliver a configuration to the remote UE, and the relay UE forwards these configurations to the remote UE through a PC5 RRC procedure, for example, which may be a dedicated resource for the remote UE. In other embodiments, the foregoing additional information may alternatively not be transmitted on the Uu interface of the relay UE. Instead, the relay UE directly transmits sidelink/relay information in an SIB that the relay UE can receive to the remote UE through a PC5 RRC procedure, or formulates new configuration information for the remote UE based on sidelink-related configuration received by the relay UE, facilitating communication between the relay UE and the remote UE. Specifically, for example, if the network side has configured a dedicated resource for the relay UE, such as a dedicated resource pool, or a periodic dedicated resource, or a multi-carrier configuration, the relay UE can notify the remote UE through a PC5 interface, so that the remote UE can use these resources more efficiently for reception.

In another example, if remote UE is in online idle state, the remote UE may obtain configuration information about sidelink/sidelink relay from a system message, so that the remote UE utilizes the information to implement a discovery procedure with the relay UE. In addition, in a subsequent relay communication procedure, the remote UE may further continue using this common configuration information.

Optionally, during the discovery procedure, the remote UE may inform the relay UE of a camping cell/status of obtaining sidelink system information of the remote UE, and the relay UE has requested a relay operation related configuration from a serving cell of the relay UE. The request information may also carry the camping cell/status of obtaining sidelink system information of the remote UE, for example, information indicating that a sidelink/relay system information configuration or a configuration information identifier can be obtained from cell1.

The purpose of carrying the foregoing additional information in the request information is to enable the network side to provide a configuration more suitable than an existing configuration for the remote UE, provide a dedicated configuration for the relay UE, and optionally enable the network side to deliver a dedicated configuration to the remote UE, and the relay UE forwards these configurations to the remote UE through a PC5 RRC procedure, for example, which may be a dedicated resource for the remote UE. In other embodiments, the foregoing additional information may alternatively not be transmitted on the Uu interface of the relay UE. Instead, the relay UE formulates PC5 configuration information for the remote UE based on a sidelink-related configuration received by the relay UE, facilitating communication between the relay UE and the remote UE.

In another example, if the remote UE is online and in connected state, no matter whether a non-3GPP interworking function (N3IWF) is enabled in a core network, for an access network node such as a CU (central unit) or gNB, the remote UE does not have an RRC connection in an L3 architecture. Therefore, when the remote UE is in connected state and needs to continue data transmission in the relay architecture, the remote UE first releases an existing connection, enters the idle state, and then establishes a relay connection. In other words, the remote UE first releases an existing dedicated sidelink configuration, and then, as described above, establishes the relay connection from the idle state.

It should be noted that in the L3 relay architecture, because the remote UE does not have a connection to the network side, there is no serving cell for the remote UE in connected state. In a case that the remote UE receives a dedicated configuration forwarded by the relay UE, the dedicated configuration is assigned by the network side for a PC5 link between the remote UE and the relay UE out of a consideration of binding the remote UE and the relay UE. Once the relay UE moves out of a current cell, the dedicated configuration becomes invalid and needs to be re-configured for a new cell, or a configuration for a source cell needs to be carried in a handover request message between an interface of a source node and an interface of a target node so that a target cell adapts the configuration to the target cell and transmits a resulting configuration to the relay UE through a handover command, and the relay UE then forwards the resulting configuration to the remote UE.

Embodiment 2 of the Present Invention: Obtaining Configuration by Remote UE in L2 Architecture In an L2 architecture, there is a direct logical connection between remote UE and a network, and a peer end of an RRC/SDAP/PDCP entity of the remote UE is located on the network side, for example, a base station or a CU. Data transmission from the remote UE to the network is transmitted through a PC5 RLC bearer and a Uu RLC bearer. A serving cell is required for the remote UE to perform a relay operation in connected state.

In the L2 architecture, the remote UE obtains a relay operation related configuration mainly from the following: 1. pre-configuration information (mainly used before a relay connection is established); 2. system message that the remote UE reads from a camping cell or serving cell; and 3. configuration information received by the remote UE from the network side through Uu RRC.

There are mainly two stages for the remote UE in the L2 relay architecture: the first stage is before establishing an RRC connection to the network side through the relay UE; and the second stage is after establishing an RRC connection to the network side through the relay UE.

In the first stage, the remote UE needs some basic configurations for sidelink relay operations, for example, an explicit indication indicating that L2 relay architectures are supported, and a condition (for example, RSRP threshold, or service requirement) of L2 relay operation. The remote UE further needs basic configurations for sidelink, such as a common resource pool, a common PC5 configuration, and the like. These configurations may be obtained in the following ways: 1. for the offline remote UE, the foregoing two types of information that are obtained through a pre-configuration message; 2. for the remote UE in idle state, the above two kinds of information are obtained by reading an SIB message; and 3. for the remote UE in connected state, a common information part of the foregoing two types of information may be obtained through an SIB message, or the network side may further configure some dedicated configurations, such as dedicated RSRP thresholds.

When determining, based on the two types of basic configuration information, that the remote UE satisfies a condition of relay operation, the remote UE initiates a discovery procedure with the relay UE and then establishes a relay connection.

In the second stage, after the remote UE establishes an RRC connection to the network side through the relay UE, the remote UE substantially enters the RRC connected state. In this state, the following processes are performed in the RRC procedure of the remote UE.

For example, the remote UE may report to the serving cell service characteristics transmitted between the remote UE and the relay UE, for example, QoS profile. The serving cell configures an SLRB, an RLC bearer, and the like for the remote UE based on this service information. The remote UE receives the SLRB, the RLC bearer, and the like of the serving cell to establish a corresponding bearer, so as to perform PC5 communication with the relay UE.

For another example, the remote UE may alternatively report service characteristics such as period and transmission size. The serving cell configures a dedicated periodic resource for the remote UE based on this information, for example, a configured grant type 1 resource and/or a configured grant type 2 resource, or a dedicated resource of another type such as a dedicated resource pool. The remote UE receives the dedicated resource and a configuration from the serving cell, and uses a related resource and configuration to perform PC5 communication with the relay UE.

In addition, the remote UE may be in different serving cells before and after establishing an RRC connection to the network side through the relay UE.

For example, before establishing the relay connection, the remote UE camps on cell1 served by gNB1 in the idle state, and the serving cell of the relay UE is cell2 served by the same gNB1. For ease of management, the serving cell of the remote UE after the relay connection is established is also determined as cell2 served by gNB1. In this case, the remote UE substantially has a common sidelink/sidelink relay configuration in an SIB message of cell1, but does not have a common sidelink/sidelink relay configuration in an SIB message of cell2. Consequently, the remote UE uses wrong configuration information for relay operation when served by cell2, unless configuration coordination between cells is performed in advance to ensure that the system configuration of cell1 is also applicable to cell2. If cell2 is a cell served by another base station, namely, gNB2, the probability of using wrong configuration information is larger.

For another example, before establishing the relay connection, the remote UE is in the offline state and has only pre-configured common sidelink/sidelink relay configuration information, and the serving cell of the relay UE is cell2 served by gNB1. For ease of management, the serving cell of the remote UE after the relay connection is established is also determined as cell2 served by gNB1. In this case, the remote UE substantially has the common sidelink/sidelink relay configuration in the pre-configuration message, but does not have a common sidelink/sidelink relay configuration in an SIB message of cell2. Consequently, the remote UE uses wrong configuration information for relay operation when served by cell2, unless configuration coordination is performed in advance to ensure that the pre-configured system configuration is also applicable to cell2.

The method of resolving the use of wrong configuration information is as follows.

Method 1: When establishing an RRC connection to a base station, the remote UE carries its own home information, such as offline status, information about a previous camping cell, or information about a previous cell reading sidelink/sidelink relay SIB message, and even specific identifier or version information in the sidelink/sidelink relay message. The home information may be carried in an RRC connection establishment request or complete message or a dedicated message.

When receiving the related home information, the network side can know whether common sidelink/relay information currently used by the remote UE is applicable to this relay operation. If not, the network side transmits new sidelink/relay configuration information to the remote UE in an RRC message. This configuration information overrides the original configuration information for the remote UE.

If a cell on which the remote UE camps and the new cell of the remote UE after the relay connection is established are the same cell, the network side does not need to transmit common configuration information, and the remote UE continues using the previous configuration information.

Method 2: The network side uses a dedicated configuration or identifier to inform the remote UE that which configuration information is universal and which is not universal.

For example, whether configuration information is universal may be explicitly indicated in pre-configuration information previously obtained by the remote UE or an SIB information of ce111. If configuration information is universal, the remote UE does not need to request for sidelink/relay configuration when establishing a connection to the network side through the relay UE. If configuration information is not universal, the remote UE needs to request for a new configuration, and the request information may be carried in an RRC connection establishment request or complete message, or a dedicated message.

In particular, when the remote UE is in connected state before and after establishing a relay connection, this process is similar to the terminal handover process. When a previous serving cell and the serving cell of the relay UE are the same cell, this process is similar to intra cell handover, and therefore both common and dedicated sidelink/relay configuration information can be still used. When a previous serving cell and the serving cell of the relay UE are different cells served by the same base station, this process is similar to inter cell intra-gNB/CU handover, and therefore both common and dedicated sidelink/relay configuration information can be reconfigured or still used. When a previous serving cell and the serving cell of the relay UE are different cells served by different base stations, this process is similar to inter-gNB/CU handover, and therefore both common and dedicated sidelink/relay configuration information need to be reconfigured, and source configuration information and target configuration information are respectively carried in a handover request message and a handover response message in an interface negotiation process between the base stations.

Embodiment 3 of the Present Invention: DC/CA Operation in L3 Architecture

In an L3 architecture, protocol stack entities corresponding to remote UE all terminate at relay UE, and there is no logical connection and entity between the remote UE and a gNB. Therefore, DC/CA operations of the relay UE have little impact on the remote UE.

From the perspective of a Uu interface of the relay UE, DRB bearers on the Uu interface of the relay UE can be divided into two categories: one is for data of the relay UE itself, and the other is for data of the remote UE. These two types of data may be carried on different DRB/RLC bearers/logical channels so that it is convenient for data retransmission and state transfer in various handover scenarios. For example, data of the relay UE is carried on DRBs 0 to 7, and DRBs 8 to 15 are bearers for the data of the remote UE on the Uu interface of the relay UE. Data bearers for different remote UEs connected to a same relay UE may be separate DRBs or a multiplexed DRB.

If the relay UE is configured with a CA operation, the relay UE may use multiple carries on the Uu interface for transmission. In the case of multiple carriers, optionally, a component carrier restriction may be configured, that is, a set of CCs that can be used for a specific logical channel/RLC bearer. This component carrier restriction is generally used when a duplication function is enabled. When a logical channel 1 and a logical channel 2 are two duplicate logical channels corresponding to one DRB, to ensure duplication effects and avoid duplication gain loss caused when duplicate data is transmitted on a same CC, the logical channel 1 may be restricted to CC1 and CC2 for transmission, and the logical channel 2 may be restricted to CC3, CC4, and CC5 for transmission.

Similarly, a similar component carrier restriction can also be used for transmission on a logical channel corresponding to data of the remote UE, so as to avoid rate mismatch caused when a data rate on the Uu interface is too high but a rate on a PC5 interface is low, where such rate mismatch leads to packet loss and resource waste. Certainly, no restriction may be configured, which means that logical channels corresponding to data of the remote UE can use any current CC.

If the relay UE is configured with a DC operation, each bearer on the Uu interface of the relay UE may be individually configured as an MCG bearer/SCG bearer/split bearer.

A bearer type may be selected for a bearer for the relay UE corresponding to data of the remote UE in such a way.

Particularly, if a data type of a remote UE has a very high QoS requirement, for example, very low latency and/or very high reliability, in this case, a duplication transmission configuration on the Uu interface may be considered for this service, so as to perform CA or DC duplication transmission.

From the perspective of the PC5 interface between the relay UE and the remote UE, because the PC5 interface and the Uu interface are independent of each other, CA/DC configured on the Uu interface substantially has no impact on the PC5 interface. However, from the perspective of rate matching, once CA/DC is configured on the Uu interface, the data rate of the remote UE is increased at the Uu interface. To make the PC5 interface match this rate so as to avoid packet loss caused by timeout and resource waste, multi-carrier sidelink transmission may also be performed on the PC5 interface in this case.

When a service type of a remote UE has a very high QoS requirement, for example, very low latency and/or very high reliability, in this case, a duplication transmission configuration on the PC5 interface may be considered for this service, so as to perform CA duplication transmission. The CA duplication configuration on the PC5 interface and the CA/DC duplication mechanism on the Uu interface may be configured together or separately.

Embodiment 4 of the Present Invention: CA Operation in L2 Architecture

In an L2 architecture, L2 protocol stack entities corresponding to remote UE terminate at relay UE, and peer entities for L3 protocol are all located in a gNB/CU. Therefore, CA/DC on an Uu interface of the relay UE has some impact on the remote UE.

RLC bearers on the Uu interface of the relay UE can be divided into two categories: one is for data of the relay UE itself, and the other is for data of the remote UE. Generally, these two types of data need to be carried on different RLC bearers/logical channels so that it is convenient for data retransmission and state transfer in various handover scenarios. For example, data of the relay UE is carried on RLC bearers/LCIDs 0 to 7, and RLC bearers/LCIDs 8 to 15 are bearers for the data of the remote UE on the Uu interface of the relay UE. Data bearers for different remote UEs connected to a same relay UE may be separate RLC bearers/LCIDs, or a multiplexed RLC bearer/LCID.

When the relay UE is configured with CA, for RLC bearers/LCIDs corresponding to the data of the remote UE, whether these RLC bearers/LCIDs are allowed to be transmitted on all CCs or only some CCs may be configured. In other words, a CC subset may be configured to limit the RLC bearers/LCIDs corresponding to the data of the remote UE. If no restriction information is present, it means that any CC can be used to transmit data of the remote UE.

On the PC5 interface, multi-carrier transmission can also be performed on a corresponding RLC bearer to guarantee effects of rate matching. For example, if a rate of 100 Mbps can be reached when a bearer is transmitted in CA mode on the Uu interface, but only a rate of only 20 Mbps is reached when the bearer is transmitted on the PC5 interface in a single-carrier mode, downlink data is accumulated at the relay UE and then deleted, wasting transmission resources on the Uu interface. In this case, if the PC5 interface also supports multi-carrier transmission with a rate of 100 Mbps, good rate matching can be performed and thus transmission efficiency can be improved.

In particular, when the remote UE has a service QoS requirement, for example, very low latency and/or very high reliability, one or more of the following configurations may be made:

On the Uu interface, a CA duplication function is configured for the RLC bearer of the remote UE, that is, two RLC bearers for transmitting duplicate data are configured to different CC subsets so as to perform duplication transmission. With the same data being transmitted on both CC subset1 and CC subset2, large reliability and latency indicators are obtained. CA duplication on the Uu interface is configured and controlled by the base station.

On the PC5 interface, a CA duplication function is configured for the RLC bearer of the remote UE, that is, two RLC bearers for transmitting duplicate data are configured to different CC subsets so as to perform duplication transmission. With the same data being transmitted on both CC subset1 and CC subset2, large reliability and latency indicators are obtained. CA duplication on the PC5 interface is configured by a PC5 RRC layer and controlled by a PC5 MAC layer, and a control node may be the relay UE or may be a transmit UE on the PC5 interface.

In a case that the relay UE is configured with DC: DC operations affect the remote UE most in that they lead to different security parameters. If a DRB of the remote UE terminates at MCG, MCG security parameters need to be used for the DRB, for example, keys and or security algorithms. If a DRB of the remote UE terminates at an SCG, SCG security parameters need to be used for the DRB. This embodiment may handle security parameters in the following manners:

1. All DRBs of the remote UE are made to terminate at only a same node: MCG or SCG, so that the remote UE only needs to obtain one set of security parameters. In addition, different remote UEs connected to a same relay UE can be differentiated, with some terminating at the MCG and the other some terminating at the SCG. This shunts data and has less impact on the remote UE.

2. The remote UE may use two or more sets of security parameters (for example, dual connectivity or multi-connectivity), a security parameter for each DRB of the remote UE is explicitly configured: MCG or SCG, so that the remote UE uses different security parameters for different DRBs. However, the underlying layer of the remote PC5 interface has no multi-connectivity operation, and is still a MAC entity. Therefore, existing signaling configurations need to be enhanced.

For the Uu interface, different paths may be selected for a Uu RLC bearer for the relay UE corresponding to the data of the remote UE. The first path is MCG bearer, and this means that the RLC bearer is directly transmitted from the relay UE to the MCG. The second path is SCG bearer, and this means that the RLC bearer is directly transmitted from the relay UE to the SCG. The third path is split bearer, and this means that the RLC bearer may be transmitted from the relay UE to both the MCG and the SCG so that two legs can substantially be used to obtain a relatively high transmission rate. In a case of split RLC bearer, one node may be selected for data aggregation so that data transmitted through the two legs is reordered based on an SN order, and submitted to a core network in order. The data aggregation node may be configured. When the data aggregation node is the MCG, an MCG security parameter is used for this bearer, and when the data aggregation node is the SCG, an SCG security parameter is used for this bearer.

Similarly, in a case that the relay UE is configured with DC, a DC duplication mechanism may also be configured on the Uu interface. To be specific, in a case of split bearer configuration, duplicate data may be transmitted through two legs to meet the requirement of high reliability and low latency. On the Uu interface, DC duplication may be configured and activated for the data of the remote UE. Correspondingly, on the PC5 interface, CA duplication may be configured and enabled based on this requirement. The two legs may be configured separately or together.

In addition, in a case of DC split transmission is performed on the Uu interface, the data rates of the two nodes are increased, and therefore for rate matching, CA transmission may alternatively be enabled at the PC5 interface.

Figure 4:
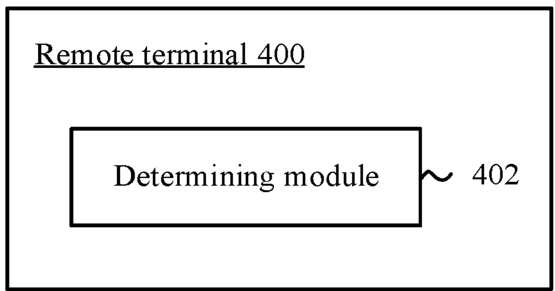
FIG. 4 is a schematic structural diagram of a remote terminal according to an embodiment of this application.

FIG. 4 is a schematic structural diagram of a remote terminal according to an embodiment of this application. As shown in FIG. 4, the remote terminal 400 includes a determining module 402 that may be configured to determine a sidelink configuration for a sidelink relay architecture based on at least one of the following: pre-configuration information; a system message received from a camping cell or serving cell; first configuration information from a relay terminal; and second configuration information from a network-side device.

In the embodiments of this application, the remote terminal may determine the sidelink configuration for the sidelink relay architecture based on at least one of the following: the pre-configuration information; the system message received from a camping cell or serving cell; the first configuration information from the relay terminal; and the second configuration information from the network-side device. This embodiment of this application helps to keep a consistent understanding among a remote terminal, a relay terminal, and a network side, thereby improving communication effectiveness.

Optionally, in an embodiment, before the determining a sidelink configuration for a sidelink relay architecture, the remote terminal is in offline state, and the determining module 402 is configured to: determine the sidelink configuration for the sidelink relay architecture based on the pre-configuration information, where the remote terminal is further configured to establish an L3 relay architecture with the relay terminal based on the pre-configuration information; and in the L3 relay architecture, determine the sidelink configuration for the sidelink relay architecture still based on the pre-configuration information; or determine the sidelink configuration for the sidelink relay architecture based on the first configuration information from the relay terminal received in a PC5 radio resource control RRC procedure.

Optionally, in an embodiment, before the determining a sidelink configuration for a sidelink relay architecture, the remote terminal is in idle state or connected state, and the determining module 402 is configured to: determine the sidelink configuration for the sidelink relay architecture based on the system message or the second configuration information from the network-side device, where the remote terminal is further configured to establish an L3 relay architecture with the relay terminal based on the system message or the second configuration information; and in the L3 relay architecture, determine the sidelink configuration for the sidelink relay architecture still based on the system message or the second configuration information; or determine the sidelink configuration for the sidelink relay architecture based on the first configuration information from the relay terminal received in a PC5 RRC procedure.

Optionally, in an embodiment, before the determining a sidelink configuration for a sidelink relay architecture, the remote terminal is in offline state, and the determining module 402 is configured to: determine the sidelink configuration for the sidelink relay architecture based on the pre-configuration information, where the remote terminal is further configured to establish an L2 relay architecture with the relay terminal based on the pre-configuration information; and in the L2 relay architecture, determine the sidelink configuration for the sidelink relay architecture based on the second configuration information from the network-side device received in an RRC procedure; or determine the sidelink configuration for the sidelink relay architecture based on the first configuration information from the relay terminal received in a PC5 RRC procedure.

Optionally, in an embodiment, before the determining a sidelink configuration for a sidelink relay architecture, the remote terminal is in idle state or connected state, and the determining module 402 is configured to: determine the sidelink configuration for the sidelink relay architecture based on the system message or the second configuration information from the network-side device, where the remote terminal is further configured to establish an L2 relay architecture with the relay terminal based on the system message or the second configuration information; and in the L2 relay architecture, determine the sidelink configuration for the sidelink relay architecture still based on the system message; or determine the sidelink configuration for the sidelink relay architecture based on the second configuration information from the network-side device received in an RRC procedure.

Optionally, in an embodiment, the remote terminal 400 further includes a transmitting module, configured to transmit service characteristics of transmission between the remote terminal and the relay terminal to the network-side device, where the service characteristics are used by the network-side device to configure radio bearer information for the remote terminal; and a receiving module, configured to receive the radio bearer information, and establish a radio bearer based on the radio bearer information, where the radio bearer is used by the remote terminal to communicate with the relay terminal.

Optionally, in an embodiment, the remote terminal 400 further includes a transmitting module, configured to transmit service characteristics of transmission between the remote terminal and the relay terminal to the network-side device, where the service characteristics are used by the network-side device to configure dedicated resource information for the remote terminal; and a receiving module, configured to receive the dedicated resource information, and communicate with the relay terminal on a dedicated resource indicated by the dedicated resource information.

Optionally, in an embodiment, the remote terminal 400 performs multi-carrier sidelink transmission with the relay terminal.

Optionally, in an embodiment, carrier aggregation CA or dual connectivity DC is configured at a Uu interface between the relay terminal and the network-side device.

Optionally, in an embodiment, the remote terminal performs CA duplication transmission for a target service with the relay terminal, where the CA duplication transmission for the target service is: directly configured for the remote terminal; configured by the network-side device for an SLRB corresponding to the target service in a case that the remote terminal reports quality of service QoS of the target service; enabling a CA duplication transmission function in a QoS profile used for the target service; or enabling a CA duplication transmission function in a QoS feature profile of the target service.

Optionally, in an embodiment, multiple RLC bearers used by the remote terminal to transmit duplicate data are configured to different component carrier CC subsets, respectively.

Optionally, in an embodiment, in a case that dual connectivity is configured at a Uu interface between the relay terminal and the network-side device: the remote terminal uses a set of security parameters, and multiple data radio bearer DRBs of the remote terminal correspond to one network device; or multiple DRBs of the remote terminal use multiple sets of security parameters.

For the remote terminal 400 according to this embodiment of this application, reference may be made to the processes of the method 200 in the corresponding embodiment of this application, and the units/modules of the remote terminal 400 and other operations and/or functions described above are respectively intended to implement the corresponding processes of the method 200, with the same or equivalent technical effects achieved. For brevity, details are not repeated herein.

The remote terminal in this embodiment of this application may be a terminal, or may be a component, an integrated circuit, or a chip in the terminal. The terminal may be a mobile terminal, or may be a non-mobile terminal. For example, the mobile terminal may include but is not limited to types of the terminal 11 listed above, and the non-mobile terminal may be a server, a network attached storage (NAS), a personal computer (PC), a television (TV), a teller machine, or a self-service machine. This is not specifically limited in the embodiments of this application.

The remote terminal in the embodiments of this application may be an apparatus with an operating system. The operating system may be an Android operating system, may be an iOS operating system, or may be another possible operating system. This is not specifically limited in the embodiments of this application.

The remote terminal provided in this embodiment of this application can implement the processes implemented in the method embodiment in FIG. 2, with the same technical effects achieved. To avoid repetition, details are not described herein again.

Figure 5:
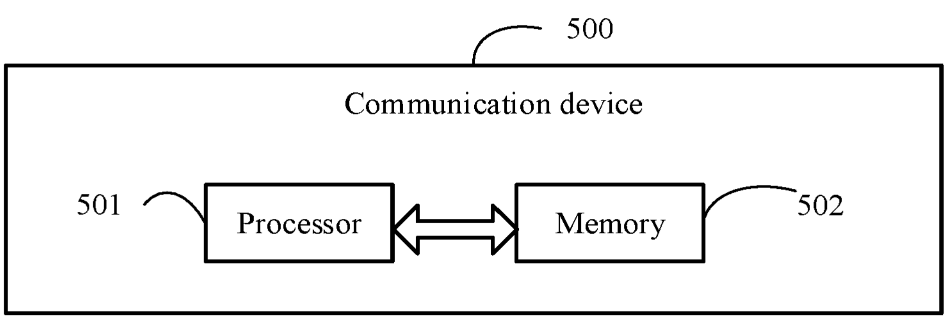
FIG. 5 is a schematic structural diagram of a communication device according to an embodiment of this application.

Optionally, as shown in FIG. 5, an embodiment of this application further provides a communication device 500, including a processor 501, a memory 502, and a program or instructions stored in the memory 502 and capable of running on the processor 501. For example, if the communication device 500 is a remote terminal, when the program or the instructions are executed by the processor 501, the processes in the foregoing embodiments of the method for configuring a sidelink relay architecture are implemented, with the same technical effects achieved.

Figure 6:
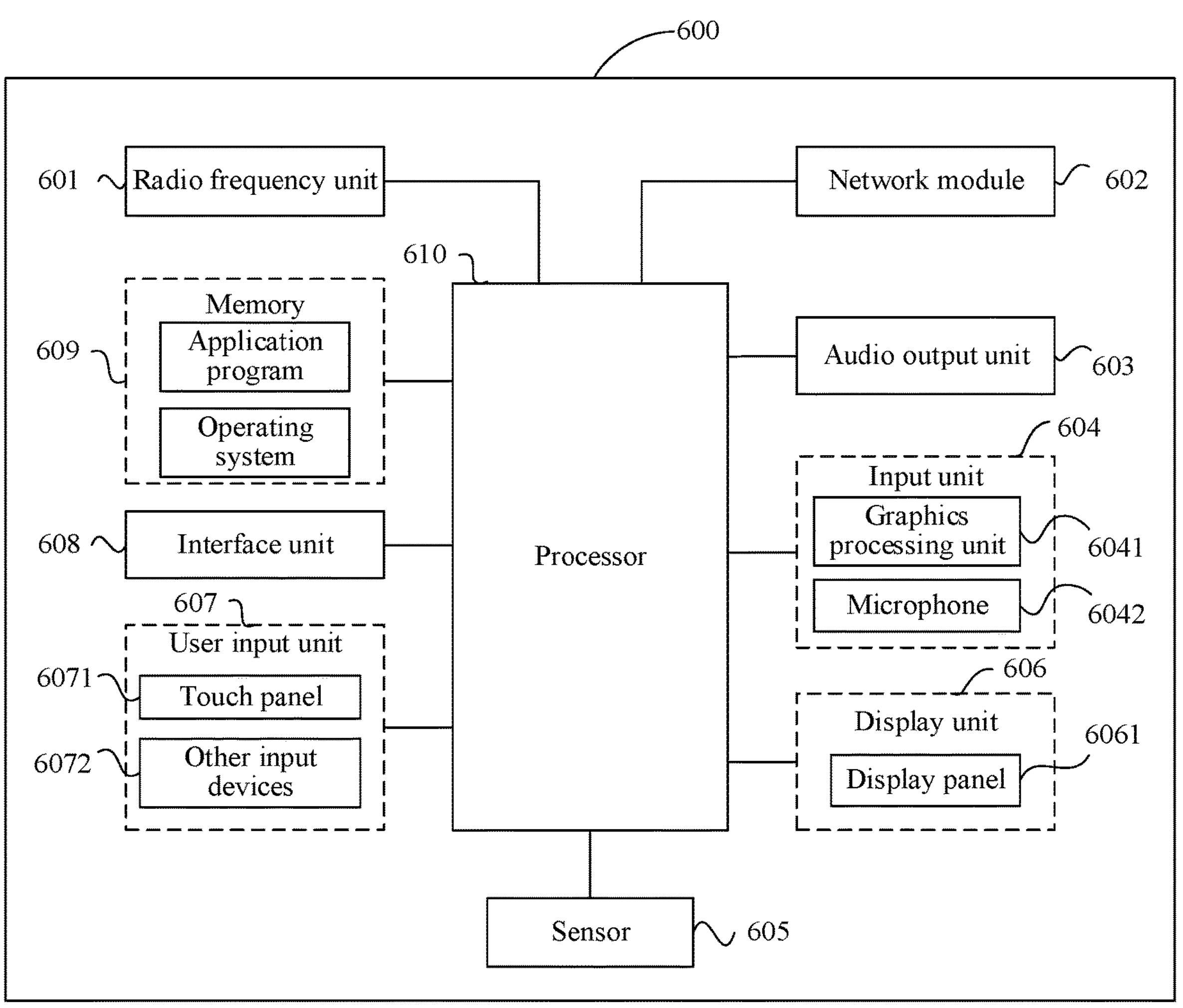
FIG. 6 is a schematic structural diagram of a terminal according to an embodiment of this application.

FIG. 6 is a schematic diagram of a hardware structure of a terminal implementing an embodiment of this application.

The terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 609.

A person skilled in the art can understand that the terminal 600 may further include a power supply (for example, a battery) that supplies power to each component. The power supply may be logically connected to the processor 610 via a power management system, so as to implement functions such as charging management, discharging management, and power consumption management by using the power management system. The structure of the terminal shown in FIG. 6 does not constitute any limitation on the terminal, and the terminal may include more or fewer components than shown in the diagram, or combine some components, or have different component arrangements. Details are not described herein.

It should be understood that this embodiment of this application, the input unit 604 may include a graphics processing unit (GPU) 6041 and a microphone 6042. The graphics processing unit 6041 processes image data of a static picture or a video that is obtained by an image capture apparatus (for example, a camera) in a video capture mode or an image capture mode. The display unit 606 may include a display panel 6061. The display panel 6061 may be configured in a form of a liquid crystal display, an organic light-emitting diode, or the like. The user input unit 607 includes a touch panel 6071 and other input devices 6072. The touch panel 6071 is also referred to as a touchscreen. The touch panel 6071 may include two parts: a touch detection apparatus and a touch controller. The other input devices 6072 may include but are not limited to at least one of a physical keyboard, a functional button (for example, a volume control button or a power on/off button), a trackball, a mouse, and a joystick. Details are not described herein.

In this embodiment of this application, the radio frequency unit 601 transmits downlink data received from a network-side device to the processor 610 for processing, and in addition, transmits uplink data to the network-side device. Generally, the radio frequency unit 601 includes but is not limited to an antenna, at least one amplifier, a transceiver, a coupler, a low noise amplifier, a duplexer, and the like.

The memory 609 may be configured to store software programs or instructions and various data. The memory 609 may mainly include a program or instruction storage area and a data storage area. The program or instruction storage area may store an operating system, an application program or instructions required by at least one function (for example, an audio play function and an image play function), and the like. In addition, the memory 609 may include a high-speed random access memory, or may include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one magnetic disk storage device, a flash storage device, or another non-volatile solid-state storage device.

The processor 610 may include one or more processing units. Optionally, the processor 610 may integrate an application processor and a modem processor. The application processor mainly processes an operating system, a user interface, an application program or an instruction, and the like. The modem processor mainly processes wireless communication, for example, a baseband processor. It should be understood that alternatively, the modem processor may not be integrated into the processor 610.

The processor 610 is configured to determine a sidelink configuration for a sidelink relay architecture based on at least one of the following: pre-configuration information; a system message received from a camping cell or serving cell; first configuration information from a relay terminal; and second configuration information from a network-side device.

In the embodiments of this application, a remote terminal (for example, the terminal 600) may determine a sidelink configuration for a sidelink relay architecture based on at least one of the following: pre-configuration information; a system message received from a camping cell or serving cell; first configuration information from a relay terminal; and second configuration information from a network-side device. This embodiment of this application helps to keep a consistent understanding among a remote terminal, a relay terminal, and a network side, thereby improving communication effectiveness.

The terminal provided in this embodiment of this application implements the processes of the foregoing embodiments of the method for configuring a sidelink relay architecture, with the same technical effects achieved. To avoid repetition, details are not described herein again.

An embodiment of this application further provides a readable storage medium. The readable storage medium stores a program or instructions, and when the program or the instructions are executed by a processor, the processes of the foregoing embodiments of the method for configuring a sidelink relay architecture are implemented, with the same technical effects achieved. To avoid repetition, details are not described herein again.

The processor may be the processor of the terminal in the foregoing embodiment. The readable storage medium includes a computer-readable storage medium such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions to implement the processes of the foregoing embodiments of the method for configuring a sidelink relay architecture, with the same technical effects achieved. To avoid repetition, details are not described herein again.

It should be understood that the chip in this embodiment of this application may also be referred to as a system-on-chip or system on a chip.

An embodiment of this application further provides a computer program product. The computer program product is stored in a non-volatile memory, and the computer program product is implemented by at least one processor to implement the processes of the foregoing embodiments of the method for configuring a sidelink relay architecture, with the same technical effects achieved. To avoid repetition, details are not described herein again.

An embodiment of this application further provides a communication device, configured to implement the processes of the foregoing embodiments of the method for configuring a sidelink relay architecture, with the same technical effects achieved. To avoid repetition, details are not described herein again.

It should be noted that in this specification, the terms "include", "include", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the embodiments of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is an example embodiment. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A method for configuring a sidelink relay architecture, applied to a remote terminal, wherein the method comprises:

determining a sidelink configuration for the sidelink relay architecture based on at least one of first configuration information from a relay terminal and second configuration information from a network-side device;

wherein the determining a sidelink configuration for the sidelink relay architecture comprises:

in a layer 2 (L2) relay architecture, determining the sidelink configuration for the sidelink relay architecture based on the second configuration information from the network-side device received in a radio resource control (RRC) procedure or determining the sidelink configuration for the sidelink relay architecture based on the first configuration information from the relay terminal received in a PC5 RRC procedure;

wherein in the L2 relay architecture, the remote terminal determines, for sidelink transmission based on the second configuration information, a sidelink radio bearer (SLRB) configuration, a service data adaptation protocol (SDAP) configuration, and a packet data convergence protocol (PDCP) configuration; and the remote terminal determines, based on the second configuration information or the first configuration information, a radio link control (RLC) bearer configuration for sidelink transmission;

wherein the method further comprises performing carrier aggregation (CA) duplication transmission for a target service with a relay terminal, wherein the CA duplication transmission for the target service is:

configured by the network-side device for a sidelink radio bearer (SLRB) corresponding to the target service in a case that the remote terminal reports quality of service (QoS) of the target service;

enabling a CA duplication transmission function in a QoS profile used for the target service; or enabling a CA duplication transmission function in a QoS feature profile of the target service.

2. The method according to claim 1, wherein the method further comprises:

performing multi-carrier sidelink transmission with the relay terminal.

3. The method according to claim 1, wherein carrier aggregation (CA) or dual connectivity (DC) is configured for a Uu interface between the relay terminal and the network-side device.

4. The method according to claim 1, wherein multiple RLC bearers used by the remote terminal to transmit duplicate data are configured to different component carrier (CC) subsets, respectively.

5. The method according to claim 1, wherein in a case that dual connectivity is configured for a Uu interface between the relay terminal and the network-side device:

the remote terminal uses a set of security parameters, and multiple data radio bearer (DRBs) of the remote terminal correspond to one network device; or multiple DRBs of the remote terminal use multiple sets of security parameters.

6. A remote terminal, comprising a processor, a memory, and a program or instructions stored in the memory and capable of running on the processor, wherein when the program or instructions are executed by the processor, the following steps are implemented:

determining a sidelink configuration for the sidelink relay architecture based on at least one of first configuration information from a relay terminal and second configuration information from a network-side device;

wherein the determining a sidelink configuration for the sidelink relay architecture comprises:

in a layer 2 (L2) relay architecture, determining the sidelink configuration for the sidelink relay architecture based on the second configuration information from the network-side device received in a radio resource control (RRC) procedure or determining the sidelink configuration for the sidelink relay architecture based on the first configuration information from the relay terminal received in a PC5 RRC procedure;

wherein in the L2 relay architecture, the remote terminal determines, for sidelink transmission based on the second configuration information, a sidelink radio bearer (SLRB) configuration, a service data adaptation protocol (SDAP) configuration, and a packet data convergence protocol (PDCP) configuration; and the remote terminal determines, based on the second configuration information or the first configuration information, a radio link control (RLC) bearer configuration for sidelink transmission;

wherein when the program or instructions are executed by the processor, the following steps are further implemented:

performing carrier aggregation (CA) duplication transmission for a target service with a relay terminal, wherein the CA duplication transmission for the target service is:

configured by the network-side device for a sidelink radio bearer (SLRB) corresponding to the target service in a case that the remote terminal reports quality of service (QoS) of the target service;

enabling a CA duplication transmission function in a QoS profile used for the target service; or enabling a CA duplication transmission function in a QoS feature profile of the target service.

7. The remote terminal according to claim 6, wherein the following steps are further implemented:

performing multi-carrier sidelink transmission with the relay terminal.

8. The remote terminal according to claim 6, wherein carrier aggregation (CA) or dual connectivity (DC) is configured for a Uu interface between the relay terminal and the network-side device.

9. The remote terminal according to claim 6, wherein multiple RLC bearers used by the remote terminal to transmit duplicate data are configured to different component carrier (CC) subsets, respectively.

10. The remote terminal according to claim 6, wherein in a case that dual connectivity is configured for a Uu interface between the relay terminal and the network-side device:

the remote terminal uses a set of security parameters, and multiple data radio bearer (DRBs) of the remote terminal correspond to one network device; or multiple DRBs of the remote terminal use multiple sets of security parameters.

11. A non-transitory readable storage medium, wherein the non-transitory readable storage medium stores a program or instructions, and when the program or instructions are executed by a processor, the following steps are implemented:

determining a sidelink configuration for the sidelink relay architecture based on at least one of first configuration information from a relay terminal and second configuration information from a network-side device;

wherein the determining a sidelink configuration for the sidelink relay architecture comprises:

in a layer 2 (L2) relay architecture, determining the sidelink configuration for the sidelink relay architecture based on the second configuration information from the network-side device received in a radio resource control (RRC) procedure or determining the sidelink configuration for the sidelink relay architecture based on the first configuration information from the relay terminal received in a PC5 RRC procedure;

wherein in the L2 relay architecture, determining, for sidelink transmission based on the second configuration information, a sidelink radio bearer (SLRB) configuration, a service data adaptation protocol (SDAP) configuration, and a packet data convergence protocol (PDCP) configuration; and determining, based on the second configuration information or the first configuration information, a radio link control (RLC) bearer configuration for sidelink transmission-;

wherein when the program or instructions are executed by the processor, the following steps are further implemented:

performing carrier aggregation (CA) duplication transmission for a target service with a relay terminal, wherein the CA duplication transmission for the target service is:

configured by the network-side device for a sidelink radio bearer (SLRB) corresponding to the target service in a case that the remote terminal reports quality of service (QoS) of the target service;

enabling a CA duplication transmission function in a QoS profile used for the target service; or enabling a CA duplication transmission function in a QoS feature profile of the target service.

12. The non-transitory readable storage medium according to claim 11, wherein the following steps are further implemented:

performing multi-carrier sidelink transmission with the relay terminal.

13. The non-transitory readable storage medium according to claim 11, wherein carrier aggregation (CA) or dual connectivity (DC) is configured for a Uu interface between the relay terminal and the network-side device.

14. The non-transitory readable storage medium according to claim 11, wherein multiple RLC bearers used by the remote terminal to transmit duplicate data are configured to different component carrier (CC) subsets, respectively.

15. The non-transitory readable storage medium according to claim 11, wherein in a case that dual connectivity is configured for a Uu interface between the relay terminal and the network-side device:

using a set of security parameters, and multiple data radio bearer (DRBs) of the remote terminal correspond to one network device; or multiple DRBs of the remote terminal use multiple sets of security parameters.

* * * * *